United States Patent Office 2,884,449
Patented Apr. 28, 1959

2,884,449
PROCESS FOR NAPHTHALENE THIOGLYCOLLIC ACIDS

William B. Hardy, Bound Brook, and Jack H. Thelin and Frank M. Furman, Somerville, N.J., assignors to American Cyanamid Company, New York, N.Y., a corporation of Maine No Drawing. Application November 9, 1956
Serial No. 621,199

10 Claims. (Cl. 260—516)

This invention relates to an improved process for the preparation of S-naphthyl thioglycollic acids and more particularly, to processes for the preparation of S-naphthyl thioglycollic acids by the reaction of naphthols and naphthol ethers with thioglycollic acid and its esters.

The S-naphthyl derivatives of thioglycollic acid are important intermediates. Especially, S-beta-naphthyl thioglycollic acid is an important intermediate for the preparation of Indanthrene Brown RRD, a very well known thioindigoid vat dye of prototype 121. This dyestuff has been known for many years, and the particular intermediate thioglycollic acid derivative has been synthesized on a plant scale by one of two routes. In the first, naphthalene beta-sulfonic acid was converted to the acid chloride and this was reduced to the mercapto compound, thio-beta-naphthol, which could be reacted with chloroacetic acid to give the beta-naphthol thioglycollic acid. This preparation has the very strong disadvantage of needing the reduction of a sulfonyl chloride, a process which is not easily carried out on a plant scale. The other preparation involves the diazotization of beta-naphthylamine (a compound known to be carcinogenic), followed by reaction of the diazo compound with a xanthate. The resulting naphthyl xanthate derivative was highly odoriferous and very unpleasant to work with on a plant scale. It was hydrolyzed to thio-beta-naphthol by reaction with caustic and then this latter compound was reacted with chloracetic acid. Both of these processes have the disadvantage of requiring a number of steps.

We have found, as the first process of our invention, that the naphthyl thioglycollic acid or their esters can be readily prepared directly from the corresponding naphthols and naphthol ethers by a one-step reaction with thioglycollic acid or its carboxylic esters. The desired naphthyl thioglycollic acid or ester is readily obtained in high yields. The reaction may be illustrated by the following equation:

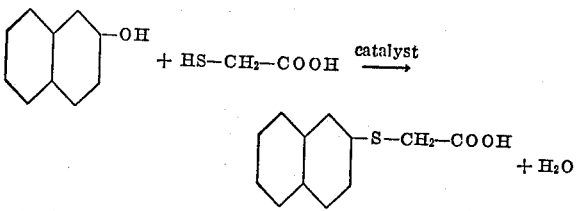

It is a particular advantage of this process of our invention, that it is carried out under the ordinary pressure and at the fairly low temperatures which are obtainable in simple equipment to give high yields. This permits the use of ordinary equipment and eliminates the need of high capital investment in costly high pressure equipment. It is a further advantage that our invention starts with cheap intermediatas and, by one step instead of several, produces naphthyl thioglycollic acids in high yields and purity, without loss as by-products.

It could not be predicted that the reaction of thioglycollic acid with an oxynaphthalene would proceed preferentially when there are a number of other possibilities for reaction of the thioglycollic acid. Thioglycollic acid when heated, can undergo a self-condensation with the formation of a ring compound of the structure:

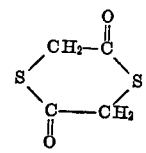

In addition to this alternative reaction, there is the further possibility, under the conditions used of esterifying the hydroxyl with the carboxylic end of the thioglycollic acid molecule. The conditions under which we carry out this reaction, are those which would be expected to esterify the hydroxyl group. When a carboxylic acid and an organic hydroxyl compound are heated together anhydrously in the presence of an acid catalyst, esterification usually takes place. Beta-naphthol is known to esterify with, for example, acetic acid, even without the presence of the acid catalyst. It is therefore most surprising that esterification does not take place and that, instead, a reaction takes place between the mercapto group and the hydroxyl with the elimination of water giving the naphthyl thioether as the end product.

It is also surprising that esters of thioglycollic acid react with naphthols by attack of the mercaptan function on the naphthol. The conditions used in this reaction are those at which ester exchange takes place readily and it would be expected that, instead of the naphthol function being attacked by the mercaptan function, the naphthol would displace the esterifying group to form a naphthyl carboxylic ester of thioglycollic acid. In spite of such expectation, no appreciable amounts of such products are observed. Further, there is a high probability of hydrolysis of the esters to the free acids under the conditions of the reaction, with the resultant possibility of esterification of the naphthol. For this reason, also, it is surprising that the esters of thioglycollic acid react so smoothly.

Between the free thioglycollic acid and the esters thereof, the free acid is greatly to be preferred because of better yields and avoidance of the complications of extra steps in the synthesis of the mercapto compound.

The oxynaphthalenes are unique in their application in this reaction. It is very remarkable that the simple phenols do not react with thioglycollic acid in this manner. Every attempt to form a phenyl thioglycollic acid by this reaction has failed. This is very surprising, since there seems no reason why a simple phenol would not react similarly with thioglycollic acid. This would have provided a very efficient method for making the necessary phenyl thioglycollic acid intermediates for the production of other thioindigoid dyes. However, every attempt to prepare a phenyl thioglycollic acid by this reaction has resulted in failure.

The reaction of thioglycollic acid with oxynaphthalenes is not to be confused with the reaction of thioglycollic acid with quinones. In the latter reaction, there is an addition to the 2,3 double bond with simultaneous reduction of the quinone to the hydroquinone, resulting for example, when 1,4-benzoquinone is used as the starting material, in the formation of 1,4-dihydroxy phenyl-2-mercapto acetic acid.

It is also surprising, that the reaction of the present invention takes place not only with naphthols but also with the lower alkyl naphthol ethers. The reaction involves the breaking of the carbon to oxygen bond in the naphthalene derivative, and it is not clear whether dealkylation must first take place to the naphthol before the reaction with thioglycollic acid proceeds, or whether the thioglycollic acid reacts directly in an exchange reaction with the alkoxy ether group. However, the mechanism of the reaction is not part of our invention. It is enough to say that we have discovered that the naphthyl ethers as well as the naphthols can be reacted with thioglycollic acid and its esters to form naphthyl thioglycollic acids and their esters.

The catalysts which are used in the process of our invention are acid-type catalysts. Generally, most acid-type catalysts are useful, such as sodium bisulfate, para-toluenesulfonic acids, alkane sulfonic acids, sulfuric acid, polyphosphoric acid, aromatic sulfonic acids, and the like. However, it is particularly preferred that the catalyst be an alkali metal acid sulfate such as sodium or potassium bisulfate or an organic sulfonic acid, such as an alkyl or an aromatic sulfonic acid. Among the inorganic acids, one can use sulfuric acid, phosphoric or polyphosphoric acid, hydrochloric acid, hydrobromic, or the like, although, sulfuric acid or polyphosphoric acid are especially preferred in this group.

The naphthalene derivatives which may be used as the starting materials in the process of our invention, comprise the naphthols and their lower aliphatic ethers such as the alkyl, alkenyl and aralkyl ethers. Examples of these are; 1-naphthol, 2-naphthol, 2-naphthylmethyl ether, 1-naphthylmethyl ether, 2-naphthylethyl ether, 2-naphthylpropyl ether, 1-naphthylbutyl ether, 5-carboxy-2-naphthol, 7-sulfo-2-naphthol, 3-methyl-2-napthol, 2-napthyl allyl ether, 2-naphthyl benzyl ether, and the like. Polyhydric naphthols and their corresponding lower alkyl ethers are also usable. Examples of these are 1,5-naphthalenediol and 2,6- and 2,7-napthalenediols and their corresponding lower alkyl ethers. It is obvious that the naphthalene derivatives which may be used, may not contain another group such as a quinone or aldehyde group, which is reactive to thioglycolic acid, or such as nitrile, which would be sensitive to the acid conditions. In general, halogeno-naphthols, alkyl and aryl naphthols, naphtholsulfonic acid, aminonaphthols, carboxynaphthols and the like are readily usable in our proces.

The esters of thioglycollic acid which may be used in our invention are not restricted, since the reaction is occurring at the other end of the molecule, and since the esterifying group is removed at the end of the process, beyond the obvious restriction that the ester group must be free of other groups interfering in the reaction, such as mercaptan, aldehyde, and the like. Usable are alkyl esters such as methyl, ethyl, propyl, butyl, and the like, alkenyl, such as allyl, aralkyl such as benzyl, or aryl such as phenyl. In general, the methyl or ethyl thioglycollate is preferred.

In the practice of our invention, the naphthol or naphthyl lower alkyl ether is heated directly with thioglycollic acid or its esters and the acid catalyst. Best results are obtained if the reaction is carried out under an inert atmosphere, such as nitrogen, in order to reduce the possibility of oxidation of thioglycollic acid to dithiodiglycollic acid. The reaction mixture is heated at temperatures ranging from about room temperature to 175° C. until the reaction is substantially complete. The necessary temperature depends on the specific reactants used, but usually the range is 70–125° C. After the reaction is complete, water is added and the solid material is broken up and isolated by ordinary methods, such as filtration, solvent extraction, and the like. The products may also be further purified by ordinary means, such as recrystallization and reprecipitation.

It is usually convenient to use a good grade of thioglycollic acid. However, for commercial purposes, it is sometimes more economical to use a crude technical grade or an ester prepared from such a grade.

Our invention can be further illustrated by the following examples in which parts are by weight unless otherwise illustrated.

*Example 1*

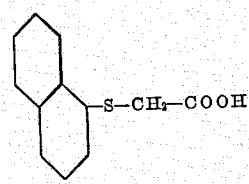

Seventy-two parts of 1-naphthol, 50 parts thioglycollic acid and 50 parts of NaHSO$_4$.H$_2$O are heated under a nitrogen blanket at 115° C., until the reaction is substantially complete. Two hundred parts water are added. The mixture is cooled and the crude product is filtered off.

The crude product is dissolved in a solution consisting of 4500 parts water and 120 parts of 20% NaOH. CO$_2$ is bubbled through until the pH is just alkaline. The insoluble material is filtered and the filtrate is acidified with conc. hydrochloric acid. The precipitated 1-naphthylthioglycollic acid is filtered, water washed and air dried. The product may be further purified by recrystallization from aqueous alcohol.

*Example 2*

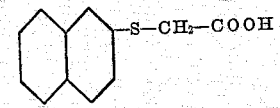

28.8 parts 2-naphthol, 20 parts thioglycollic acid and 5 parts mixed alkane sulfonic acids are heated under N$_2$ at 109–115° C., until the reaction is substantially complete. The reaction mixture is drowned into 2000 parts of 60° C. water. Sodium hydroxide is added until the product dissolves and the pH is adjusted with dilute sodium hydroxide and sulfuric acid until it is alkaline to Brilliant Yellow indicator paper, but not alkaline to phenolphthalein paper. The mixture is diluted to 3000 parts and a small amount of insoluble matter is filtered. The filtrate is acidified with conc. sulfuric acid and the S(2-naphthyl)thioglycollic acid is filtered off, water washed and dried. The product may be further purified by recrystallizing from aqueous alcohol.

*Example 3*

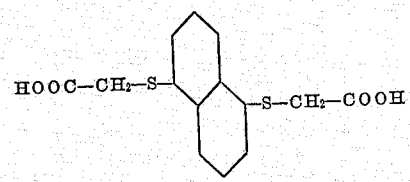

Thirty-two parts 1,5-naphthalenediol, 50 parts thioglycollic acid and 20 parts of p-toluene sulfonic acid are heated under N$_2$ at 108–120° C. until the reaction is substantially complete. Five-hundred parts of water are mixed with the reaction mixture and the crude product is filtered. The wet cake is dissolved in 1800 parts of water and enough sodium hydroxide to adjust the pH to 7. One-hundred and fifty parts of 10% NaHCO$_3$ and 1 part Darco are added. The solution is clarified and the filtrate is acidified with conc. HCl. The naphthalene-1,5-bis-thioglycollic acid is filtered, washed with water and dried in a 70° C. oven.

When the above process is followed using only 25 parts of thioglycollic acid instead of 50 parts, there is isolated from the reaction mixture 1-naphthol-5-thioglycollic acid.

*Example 4*

31.6 parts 2-methoxynaphthalene, 20 parts thioglycollic acid and 10 parts p-toluene sulfonic acid are heated under N$_2$ at 98–111° C. until the reaction is substantially complete. The reaction mixture is diluted to about 2000 parts with water and the pH is adjusted with caustic to just alkaline to Brilliant Yellow paper. The mixture is extracted with 350 parts carbon tetrachloride. The water layer is separated and acidified with concentrated HCl. The S(2-naphthyl)thioglycollic acid is filtered and washed with water.

*Example 5*

A mixture of 28.8 parts of 2-naphthol, 10 parts of mixed toluene sulfonic acids and 24 parts of ethyl thioglycollate are heated to 105–110° C. under a nitrogen blanket until the reaction is substantially complete. The mixture is diluted with water and the insoluble product isolated by decantation. It is then reslurried in water and made alkaline with about 10 parts of caustic. The mixture is heated on a steam bath until saponification is complete; after which it is clarified. The filtrate, on acidification gives 2-naphthyl thioglycollic acid.

We claim:

1. A process for the preparation of S-thioglycollic acid derivatives of naphthalenes which comprises heating a derivative of naphthalene selected from the group consisting of oxy and lower alkoxy derivatives of naphthalenes with a compound of the group consisting of thioglycollic acid and thioglycollic acid esters in the presence of an acid catalyst, under substantially anhydrous conditions.

2. The process of claim 1 in which thioglycollic acid itself is reacted with the said naphthalene derivative.

3. The process of claim 2 in which the naphthalene derivative is beta-naphthol.

4. The process of claim 3 in which the catalyst is sodium bisulfate.

5. The process of claim 3 in which the catalyst is para-toluene sulfonic acid.

6. The process of claim 2 in which the naphthalene derivative is alpha-naphthol.

7. The process of claim 2 in which the naphthalene derivative is a dioxynaphthalene.

8. The process of claim 7 in which the dioxynaphthalene is 1,5-dioxynaphthalene.

9. The process of claim 2 in which the naphthalene derivative is a lower alkoxynaphthalene.

10. The process of claim 9 in which the naphthalene derivative is 2-methoxynaphthalene.

References Cited in the file of this patent

UNITED STATES PATENTS 2,445,356    Kharasch et al.   ---------- July 20, 1948

OTHER REFERENCES

Houben-Weyl: Methoden der Organischen Chemie, vol. 9, p. 117 (1955).